United States Patent [19]

Erickson

[11] 3,830,134
[45] Aug. 20, 1974

[54] SEALED EXPANSION ANCHOR
[75] Inventor: Lloyd Arthur Erickson, Park Ridge, Ill.
[73] Assignee: Illinois Tool Works Inc., Chicago, Ill.
[22] Filed: Dec. 26, 1972
[21] Appl. No.: 318,295

[52] U.S. Cl.................... 85/80, 85/83, 151/41.75, 24/73 PF
[51] Int. Cl............................................ F16b 13/06
[58] Field of Search................... 85/80, 83, 5 R, 82; 151/41.75; 24/73 PF, 73 HS, 208 A, 73 P, 213 R

[56] References Cited
UNITED STATES PATENTS

| 3,342,098 | 9/1967 | Schuplin | 85/83 |
| 3,574,899 | 4/1971 | Fisher | 85/80 |
| 3,701,302 | 10/1972 | Pestka et al. | 85/80 |
| 3,701,373 | 10/1972 | Wronke et al. | 85/80 |
| 3,752,032 | 8/1973 | Fiddler | 85/80 |

Primary Examiner—Marion Parsons, Jr.
Attorney, Agent, or Firm—J. R. Halvorsen; Robert W. Beart

[57] ABSTRACT

A one-piece plastic anchor for accommodating a cylindrical expander element such as a screw threaded fastener in fixed relation to an apertured workpiece. The anchor member includes an apertured clamping head and a shank section which has a pair of spaced leg members and an oval tubular member spaced from and located between said legs in communication with the head aperture to accommodate the expander element for the purpose of distorting the oval tubular member into engagement with the medial surfaces of said legs to lock the anchor in the workpiece aperture.

9 Claims, 6 Drawing Figures

PATENTED AUG 20 1974 3,830,134

3,830,134

SEALED EXPANSION ANCHOR

BACKGROUND OF THE INVENTION

This invention relates to fastening devices, and more particularly relates to an improved construction for a fastening device of the type adapted to receive an expander element such as a screw threaded fastener used for mounting an article in fixed relation relative to an apertured supporting structure.

The prior art is replete with examples of fastening devices that may be inserted into an apertured workpiece and expanded by some means such as a screw threaded element, for the purpose of attached a device to an apertured workpiece. Such devices have included one-piece plastic elements having an apertured head adapted to accept a screw and one or more depending shank elements for engagement with the sidewalls of the aperture in the workpiece and with the screw threaded fastener being adapted to expand the shank portions into locked engagement with said workpiece. Other devices have included polygonal shaped tubular members for the purpose of insulating the screw from the surrounding environment. In many instances, such fasteners both with and without the tubular element, permitted a cocking, or angular disposition of the screw when inserted by an operator and did not effectively expand the leg elements into locked relation relative to the work panel. Additionally, those fasterners having the polygonal shaped tubular elements, which were provided for purposes of insulating the screw from the surrounding environment, also allowed the canting or angular disposition of the screw resulting in a puncturing or perforation of the tubular member and the presentation of an exposed portion of the screw, thereby permitting the undesired electrical contact to be made. In both of these varieties of fasteners, there has been provided only a limited engagement between the threads of the screw and the anchor element, thereby limiting the torque which could be applied to the screw before stripping would occur. Where various portions of the elements of these fasteners had been increased in dimension in an attempt to overcome these difficulties, the resultant fastener was difficult to insert and also would not accept a great tolerance variations in the workpiece aperture or in the thickness of the workpiece per se.

BRIEF SUMMARY OF THE INVENTION

It is a principal object of the present invention to provide a one-piece plastic fastening device made from polymeric material which will overcome many of the deficiencies found in previous fasterers and yet is of a rugged construction capable of economic, large volume, mass production.

Another object of the present invention is to provide a fastening device of the character described, which can be readily inserted into the workpiece aperture and which includes an improved tubular member which increases the holding power previously known for retaining a threaded element in self-threading relationship within the tubular member.

Still another object of the present invention is to provide a fastening device which includes flexible legs spaced from the tubular member which may be moved into engagement with the support structure through expansion of the tubular member by insertion of a screw therein.

A further object of the present invention is to provide a tubular member having a substantially uniform wall thickness presenting a continuous oval bore, with the circumferential measurement of the oval bore being substantially equal to the circumferential measurement of the cylindrical expander element inserted therein and more particularly, being substantially equal to the pitch diameter of a screw adapted to be used with the tubular element whereby it is insured that the screw will have an increased selfthreading relationship and thereby increased holding power relative to the anchor than has been known heretofore.

A still further object of the present invention is to provide a fastening device wherein said tubular element adjacent the head of the fastener is increased in lateral dimension and wall thickness and the bore communicating through the head is counterbored to insure central location of the screw threaded fastener in relation to the tubular element, whereby cocking of the screw relative to the anchor is substantially eliminated. Additionally, the end of the tubular member is closed to provide an effective seal for the prevention of foreign materials such as moisture, dirt, and the like being emitted through the opening in the support structure as well as insulating the screw expander element from contact with the surrounding environment and protection of the sharp end of the screw from contact with an operator's extremities.

DESCRIPTION OF THE PREFERRED EMBODIMENT

Figure 1:
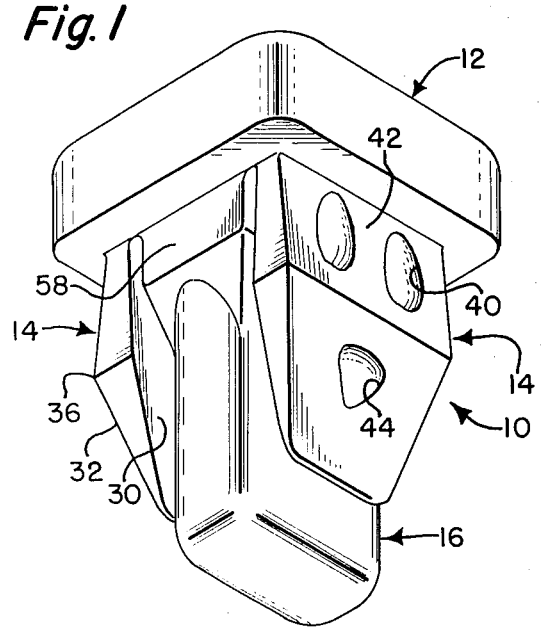
FIG. 1 is a prospective view of an anchor member made in accordance with the present invention and adapted to be inserted in the aperture of a work structure.

Referring now to the drawing wherein similar parts are designated by similar numerals, and in particular to FIG. 1 thereof, a one-piece plastic anchor 10, embodying one form of the present invention, includes a head 12, a pair of spaced elongated legs 14 integral with and depending from the head 12 and a centrally located generally oval tubular element 16 which is located between the medial surfaces of the legs 14 and spaced from each of said legs. An anchor 10 is preferably of a one-piece construction and fabricated from a polymeric material, such as nylon, or the like and which may be economically produced by conventional forming methods, such as molding, as are known in the art.

Figure 2:
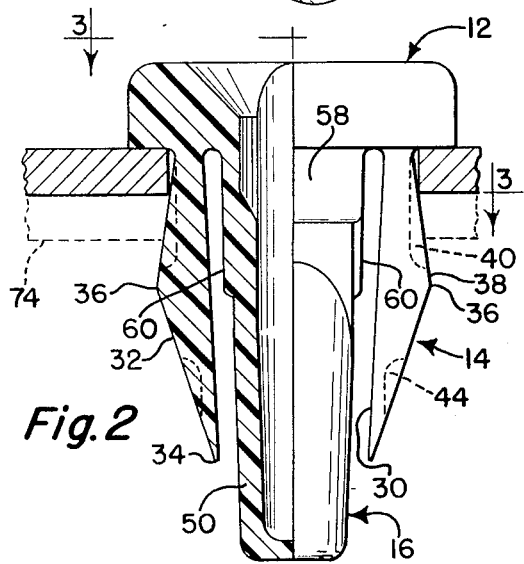
FIG. 2 is a side elevational view in partial section of an anchoring device made in accordance with the present invention and shown in mounted relation to support structure.
Figure 3:
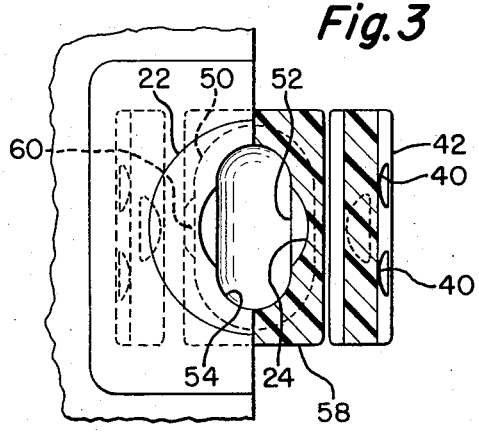
FIG. 3 is a top plan view in partial section of the fastening device illustrated in FIG. 2.
Figure 4:
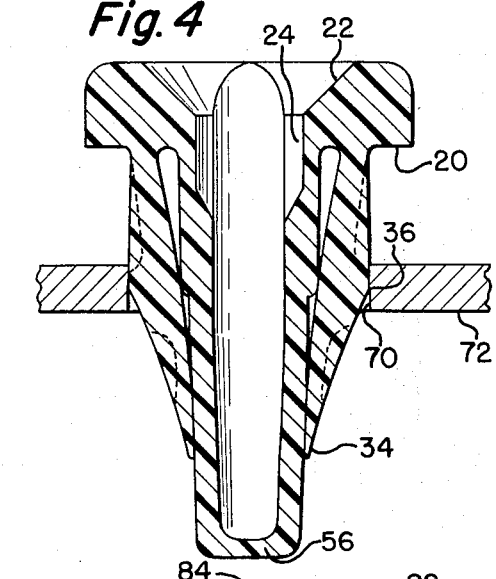
FIG. 4 is a side elevational view in section showing the fastening device illustrated in FIG. 2 as it is being inserted into the apertured work structure.

As best seen in FIGS. 2 through 4, the head 12 includes a clamping face 20 and a central aperture 22 which is generally tapered outwardly to provide a lead in for location of the expander element. A lower portion 24 is generally cylindrical and complimentary to the expander element, as will be discussed further hereinafter. While in the present embodiment the head is shown as being square, it must be recognized that the thickness and external configuration of the head is purely a matter of design choice for the specific application of the fastener.

Extending downwardly from the clamping side 20 of the head 12 are a pair of spaced integral legs 14. The legs 14 are generally polygonal in cross-section as viewed in a transverse plane parallel to the clamping surface 20 and in the present embodiment are rectangular. The legs are provided with a medial surface 30 with the lower outer surface 32 tapering outwardly from the free extremity 34 to a high point or shoulder 36 and thence inwardly along the upper portion 38 to the juncture with the head, thereby giving a generally triangular cross-section when viewed in a plane parallel to the axis of the fastener. The upper portion 38 may be provided with a plurality of axially extending grooves 40 having a diminishing width as they approach the head 12 to thereby provide a plurality of tapering ribs 42, for purposes best set forth hereinafter. The lower portion 32 may also be relieved by suitable means such as a groove 44 for purposes which will be described hereinafter.

Depending centrally from the head 12 is the tubular member 16 having a continuous wall 50 which is substantially uniform in thickness through a major portion of its axial extent. In the present embodiment, the wall 50 is provided with a pair of opposed flat sides 52 and a pair of curved connecting end walls 54, thereby forming a generally oval shaped tubular member 16, which is preferably closed at its lower end by end wall 56. The internal bore of tubular member 16 formed by the flat walls 52 and curved connecting wall 54 is generally oval in shape and has a circumferential measurement substantially equal to the expander element or when the expander element is a screw, such circumferential measurement is substantially equal to the pitch diameter circumferential measurement of the screw to be associated therewith. Adjacent the upper end of tubular member 16 is a generally rectangular increased thickness portion 58 having a width substantially equal to the width of the legs 14. The lower portion of the counterbore 24 traverses not only a portion of the head, but extends down into the thickened portion 58 to assist in and insure the central location of the screw during its insertion by an operator. It will be noted in FIGS. 3 and 4 that the bore of the tubular member formed by the sidewalls 52 and curved end walls 54 extend upwardly through the head 12 and blend into the counterbores 22 and 24. A pair of ribs 60 having limited lateral extent extend axially down from the thickened portion 58 to a point passing through the transverse plane containing the shoulders 36. When the expander element is positioned within the bore of the tubular member 16, the ribs 60 are brought to bear aginst the legs and assist in the aggressive urging of the legs laterally into engagement with the panel as will be seen hereinafter.

Figure 6:
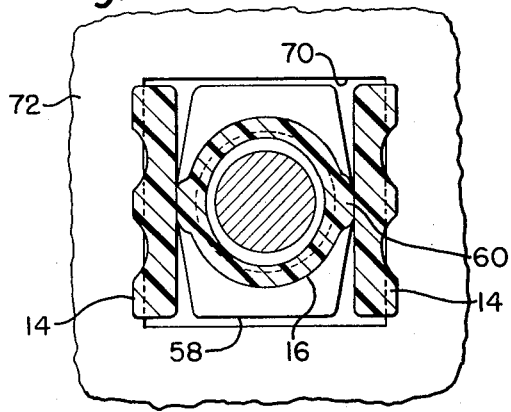
FIG. 6 is a sectional view of the expanded fastener as taken along lines 6—6 of FIG. 5.

As can be best seen in FIG. 4, the telescopic association of the fastener 10 through the aperture 70 in the panel 72 results in the inward flexing of the legs 14. The lower cam surface 32 serves to guide the legs inwardly and as the aperture 70 rides up the cam surface 32, the legs are flexed inwardly until they are in contact with the tubular member 16. In those instances where the tolerances of aperture 70 are on the low side, there is a tendency for the free extremity 34 of the legs 14 to flex or curve with the relief portion 44 serving to assist in this function. Similarly, it is possible for the tubular member 16 to be inwardly collapsed to assist in the entry. When the fastener has traversed the high point 36, the legs tend to flex outwardly again and generally assume the position shown in FIG. 2, after the entry of the fastener into aperture 70 has been completed. The introduction of an expander element such as screw 80, in this instance, the screw including a clamping head 82 and a driving means such as kerf 84, for purposes of clamping an apertured plate 74, will result in the lateral expansion of the tubular member 16 until it is brought to bear against the medial surfaces of the legs 14 to aggressively bring them into engagement with the aperture 70 and the undersurface of panel 72 adjacent the aperture. As was previously mentioned, the internal configuration of the bore in tubular member 16 is related size-wise to the pitch diameter of the screw 80 thereby insuring substantially complete thread engagement about the periphery of the screw and the transformation of the oval shape of the tubular member 16 into a cylindrical shape resulting in the lateral displacement of the side walls 52 in the direction of the medial surfaces of legs 14, as best seen in FIG. 6, and the intimate engagement by the ribs 60 with said legs 14.

Figure 5:
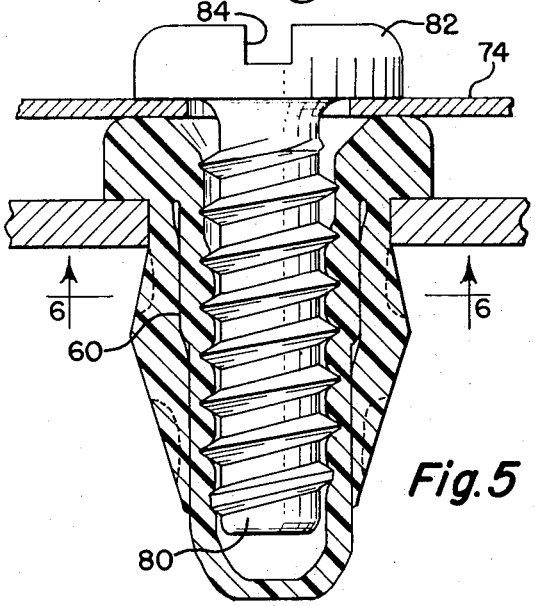
FIG. 5 is a side elevation in section showing the fastening device illustrated in FIG. 2 in its expanded position by an expander element, such as a screw, clamping a secondary member in relation to the anchor and support structure.

Referring back to FIG. 2, it will be noted that the preferred size of the aperture 70 in panel 72 is generally equal to the diametral placement of the legs 14. While it will be recognized that most plastic materials have a certain degree of distortability, it is possible, through the use of the grooves or slots 40 and the intermediate and surrounding ribs 42 to provide limited areas of contact with the edge of the aperture which are capable of being crushed or moved laterally into the grooves 40. Additionally, this will permit the same fastener to be utilized with a plurality of thicknesses of panel, as shown in phantom at 74 in FIG. 2. A close look at FIG. 5 with the fastener in its expanded position, will reveal that there is an intimate engagement between the legs of the fastener and the sidewall of the aperture.

Thus, this fastener provides an ease in installation which was absent in most of the fasteners previously disclosed in the prior art, substantially insures the axial positioning of the screw, provides a maximum thread engagement about the periphery of the screw to increase the holding power and stripping torques available, as well as insuring a maximum retention power in the panel by the locking of the legs 14 through the expansion of the tubular member 16.

Thus, it can be seen that the present invention resolves most of the objections to the prior art through the use of a simple one-piece plastic insulating grommet which can be fabricated in a relatively simple mold thereby resulting in an economical solution to the problem. The screw is insulated from the surrounding environment and is completely enclosed within the tubular member 16 to prevent the laceration of the serviceman's hands when exposed to the underside of panel 72.

I claim:

1. A one-piece plastic anchor member for insertion into an apertured workpiece and adapted to accept the shank of a screw, said anchor including a head having an aperture therein and a surface for clampingly engaging one side of a workpiece, a shank flexibly attached to and extending from said head, said shank having a pair of legs spaced laterally from one another throughout their length, a hollow flexible tubular member extending from said head between and laterally spaced from said legs, said tubular member including an endless sidewall of substantially unform thickness and being generally oval with a pair of opposed flat sidewalls, respectively generally paralleling the medial surface of said legs and a pair of curved end walls connecting said sidewalls at opposite ends thereof, said tubular member defining a generally axially extending bore communicating with said head aperture, the inner surface of said tubular member forming said oval bore having a circumferential extent substantially equal to the pitch diameter of said screw whereby said flexible tubular element is transformed from an oval to a substantially cylindrical configuration with its incidental lateral expansion outwardly into engagement with and urges said legs against the surfaces forming the aperture in said workpiece upon insertion of said screw into said bore, said cooperation between the circumferential extent of the bore and the pitch diameter of the screw insuring substantial thread engagement through a substantial circumferential portion of said tubular member whereby said screw is securely retained against inadvertent axial withdrawal.

2. An anchor member of the type claimed in claim 1 wherein said tubular member includes a thickened generally rectangular wall portion adjacent its juncture with the head having a width substantially equal to the width of said legs, said rectangular portion being generally larger than said tubular member in lateral dimension and adapted to serve as a complimentally shaped locating and shear element within said workpiece aperture.

3. An anchor member of the type claimed in claim 2, wherein within said rectangular portion said bore is counterbored to accommodate and locate said expander element.

4. An anchor member of the type claimed in claim 1, wherein said legs include shoulder forming means on their laterally opposed outer surfaces disposed intermediate their axial extent.

5. An anchor member of the type claimed in claim 4, wherein said tubular member includes integral protuberance means on its flat sidewalls which are adapted to engage and urge said legs laterally when said expander element is inserted.

6. An anchor member of the type claimed in claim 5, wherein said protuberance means includes a centrally disposed axially extending rib which is disposed on said tubular member so as to be axially disposed at and above a transverse plane including said shoulder means.

7. An anchor member of the type claimed in claim 6, wherein the oppositely facing outer surfaces of said legs taper outwardly from their free ends to said intermediate point and then inwardly toward their connection with said head to form said shoulder means.

8. An anchor member of the type claimed in claim 4, wherein said legs each further include at least one axially extending groove means disposed between said head and said shoulder means, whereby said legs have at least two axially extending crushable ribs of limited width relative to said legs and capable of being deformed to form secondary shoulder means for engaging the workpiece adjacent its aperture.

9. An anchor member of the type claimed in claim 8, wherein said legs are each relieved between said shoulder means and the free end of said leg to increase resiliency of the legs when moved inwardly against said tubular member during insertion into the workpiece aperture.

* * * * *